(12) United States Patent
Maskit et al.

(10) Patent No.: US 9,246,705 B2
(45) Date of Patent: Jan. 26, 2016

(54) MANAGEMENT MODULE FOR STORAGE DEVICE

(71) Applicant: Kaminario Technologies Ltd., Yokne'am Ilit (IL)

(72) Inventors: Shai Maskit, Haifa (IL); Eran Mann, Yoqneam (IL); Itzhak Perelstein, Hoshaya (IL)

(73) Assignee: Kaminario Technologies Ltd., Yokne'am Ilit (IL)

( * ) Notice: Subject to any disclaimer, the term of this patent is extended or adjusted under 35 U.S.C. 154(b) by 453 days.

(21) Appl. No.: 13/833,130

(22) Filed: Mar. 15, 2013

(65) Prior Publication Data

US 2014/0280670 A1 Sep. 18, 2014

(51) Int. Cl.
*G06F 11/00* (2006.01)
*H04L 12/46* (2006.01)
*G06F 11/20* (2006.01)

(52) U.S. Cl.
CPC ........ *H04L 12/4625* (2013.01); *G06F 11/2028* (2013.01)

(58) Field of Classification Search
CPC ...................................................... H04L 29/14
USPC ......................................... 714/4.1, 4.11, 4.12
See application file for complete search history.

(56) References Cited

U.S. PATENT DOCUMENTS

| | | | |
|---|---|---|---|
| 2009/0240790 A1* | 9/2009 | Utsunomiya et al. | 709/221 |
| 2010/0165877 A1* | 7/2010 | Shukla et al. | 370/254 |
| 2012/0110291 A1 | 5/2012 | Zilber et al. | |
| 2012/0265926 A1 | 10/2012 | Tal et al. | |
| 2013/0205108 A1 | 8/2013 | Perelstein et al. | |
| 2013/0238785 A1* | 9/2013 | Hawk et al. | 709/224 |

* cited by examiner

*Primary Examiner* — Dieu-Minh Le
(74) *Attorney, Agent, or Firm* — Wiggin and Dana LLP; Gregory S. Rosenblatt; Jonathan D. Hall

(57) ABSTRACT

The present invention discloses a management module for a storage device. The management module comprises a primary server and a secondary server. Each server comprises a network port configured to interface the server and a telecommunication network and a virtual bridge configured to selectively enable or disable data transfer to and from the network port. The virtual bridges of the primary and secondary servers are linked for enabling data transfer between said virtual bridges, the virtual bridge of the primary server is configured to disable data transfer while the virtual bridge of the secondary server is configured to enable data transfer and the virtual bridge of the primary server is further configured to maintain an IP address of the management module.

20 Claims, 5 Drawing Sheets

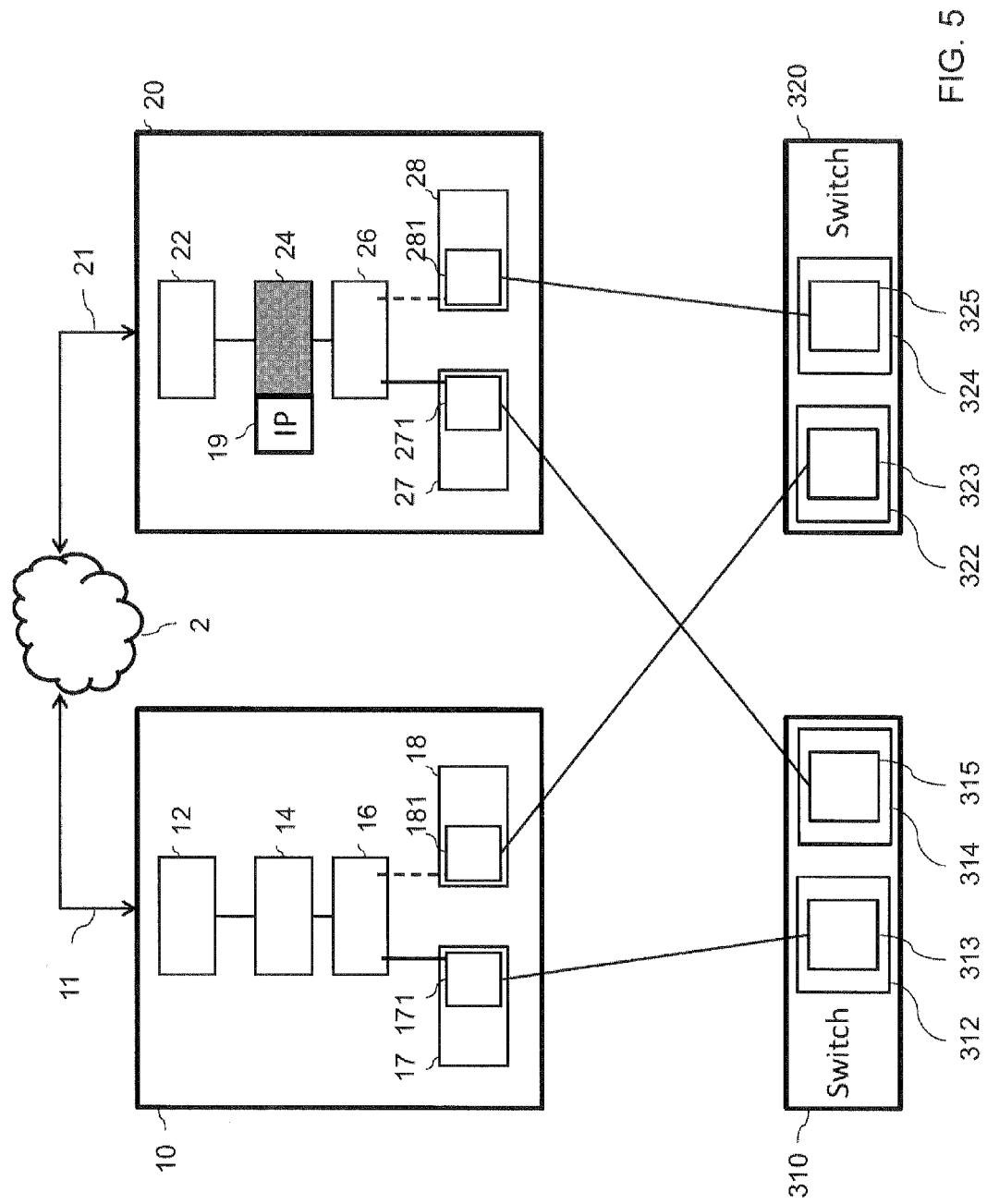

MANAGEMENT MODULE FOR STORAGE DEVICE

TECHNOLOGICAL FIELD

The present disclosure relates generally to the field of storage device management and control

BACKGROUND

Data storage has become a key issue in the modern information technology. Current large scale storage techniques generally provide storage systems for storing data and allow user interaction through telecommunication networks.

For example, US Pre-Grant Patent Publication No. 2012/0265926 to Tal et al. discloses a storage system used for storing hosts data and for allowing the hosts to read and write data to and from the storage system using a telecommunication network. The storage system includes a storage system controller controlling certain aspects of the operation of various components. The storage system controller includes a host interface to facilitate communication with the hosts through the telecommunication network.

GENERAL DESCRIPTION

However, problems can arise due to telecommunication network failure and unavailability of the storage system controller, for example. In order to obtain a high availability, current techniques only propose using two different Internet Protocol (IP) address on two different servers. These techniques present several drawbacks and particularly the need for allocating some or all of the following: additional hardware, additional IP address and additional connectivity port. However, these resources may be limited in certain circumstances and it may be beneficial to avoid allocating additional hardware, IP address and/or connectivity port. Therefore, there is a need for a management module for a storage device providing a high availability while limiting use of some or all of the aforementioned resources, and possibly also others.

Thus, some examples of the present disclosure provides a solution to a problem of maintaining a highly available IP address while using a single IP address. This notably enables maintaining a highly available IP address while keeping to minimum the number of cables that connect the storage system to a user's network, for example. Further, the some example of the present disclosure offer an installation process where only one IP address (or a reduced number of IP addresses) needs to be maintained for the storage system.

Particularly, in an aspect, some examples of the present disclosure provide a management module for a storage device. The management module comprises a primary server and a secondary server. Each server comprises a network port configured to interface the server and a telecommunication network; and a virtual bridge configured to selectively enable or disable data transfer to and from the network port. Further, the virtual bridges of the primary and secondary servers are linked for enabling data transfer between said virtual bridges; the virtual bridge of the primary server is configured to disable data transfer while the virtual bridge of the secondary server is configured to enable data transfer; and the virtual bridge of the primary server is further configured to maintain an IP address of the management module.

In some examples, the primary and secondary servers each further comprises: a management port configured to interface the server and the storage device, and a virtual port provided on the management port, the virtual bridge being linked to the virtual port to enable management data transfer to and from the virtual port. Further, the virtual ports of the primary and secondary servers are linked to enable data transfer between said virtual ports.

In some examples, the management module further comprises a switch configured for selectively enabling data transfer between the virtual bridges of the primary and secondary servers.

In some embodiments, data transfer between the virtual bridges of the primary and secondary servers is provided using redundant links.

In some embodiments, the primary and secondary servers each further comprises: an additional management port configured to provide a supplementary interface between the server and the storage device; an additional virtual port provided on the additional management port; and a bond configured to aggregate a link from the virtual port and an additional link from the additional virtual port and to enable data transfer to and from the virtual bridge.

In some embodiments, for each of the primary and secondary server, the additional virtual port and the virtual port are alternatively configured to be passive thereby providing an active/passive bonding configuration.

In some embodiments, the telecommunication network is a Local Area Network.

In some embodiments, the management module is further configured to communicate using TCP/IP protocols.

In some embodiments, the network port is an Ethernet port.

In some embodiments, each of the primary and secondary servers further comprise an application unit capable of managing at least one volume entity on the storage device upon reception of management data.

In some embodiments, the application unit enables to create or to delete a volume entity from the storage device.

In some embodiments, the application unit of each of the primary and secondary servers is further capable of sending email alerts when a predefined rate of the volume entity is used In some embodiments, the management module further comprises a control management interface configured for enabling management of the management module by a remote user, the management interface being either a command line interface or a graphical user interface.

In some embodiments, the management module further comprises a network address translator configured for avoiding the virtual bridge of the primary server to appear on two different ports in the telecommunication network.

In some embodiments, the network address translator is configured to attach a specific network address to management data generated on the primary server and routed to the telecommunication network via the secondary server.

In some embodiments, when receiving management data from the secondary server designated to said specific network address, the translator translates the network address to that of the primary server.

In some embodiments, in case the primary server fails, the management module is further configured to: power down the primary server; disable the virtual bridge of the secondary server; and configure the virtual bridge of the secondary server as the destination and/or the source of the management data communicated to and/or from the management module.

In some embodiments, in the case the primary server recovers, the management module is further configured to enable the virtual bridge of the primary server.

In some embodiments, the primary and secondary servers are implemented on a single computer machine.

In another broad aspect, the present disclosure provides a method of configuring a primary management server and a secondary management server of a management module, wherein both the primary and secondary servers are configured to be connected to a telecommunication network by a network port. The method comprises: providing each server with a virtual bridge configured to selectively enable or disable data transfer to and from the network port; disabling the virtual bridge of the primary server while enabling the virtual bridge of the secondary server; linking the virtual bridges of the primary and secondary servers so as to enable data transfer between said second gates; and configuring the virtual bridge of the primary server to maintain the IP address of the management module.

In another broad aspect, the present disclosure provides a management module for a storage device, the management module comprising a primary server and a secondary server being communicatively linked, wherein an IP address is maintained on the primary server and the secondary server is configured to provide a secondary routing to the IP address.

In some embodiments, each of the primary and secondary server comprise a virtual bridge configured to selectively enable or disable data transfer to and from a network port and the primary and secondary server are communicatively linked through the virtual bridges.

In some embodiments, the IP address of the management module is maintained on the virtual bridge of the primary server.

In some embodiments, the virtual bridge of the primary server is enabled while the virtual bridge of the secondary server is disabled.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 5 illustrates a management module of a storage system after handling of primary server failure according to some embodiments of the present disclosure.

Figure 1:
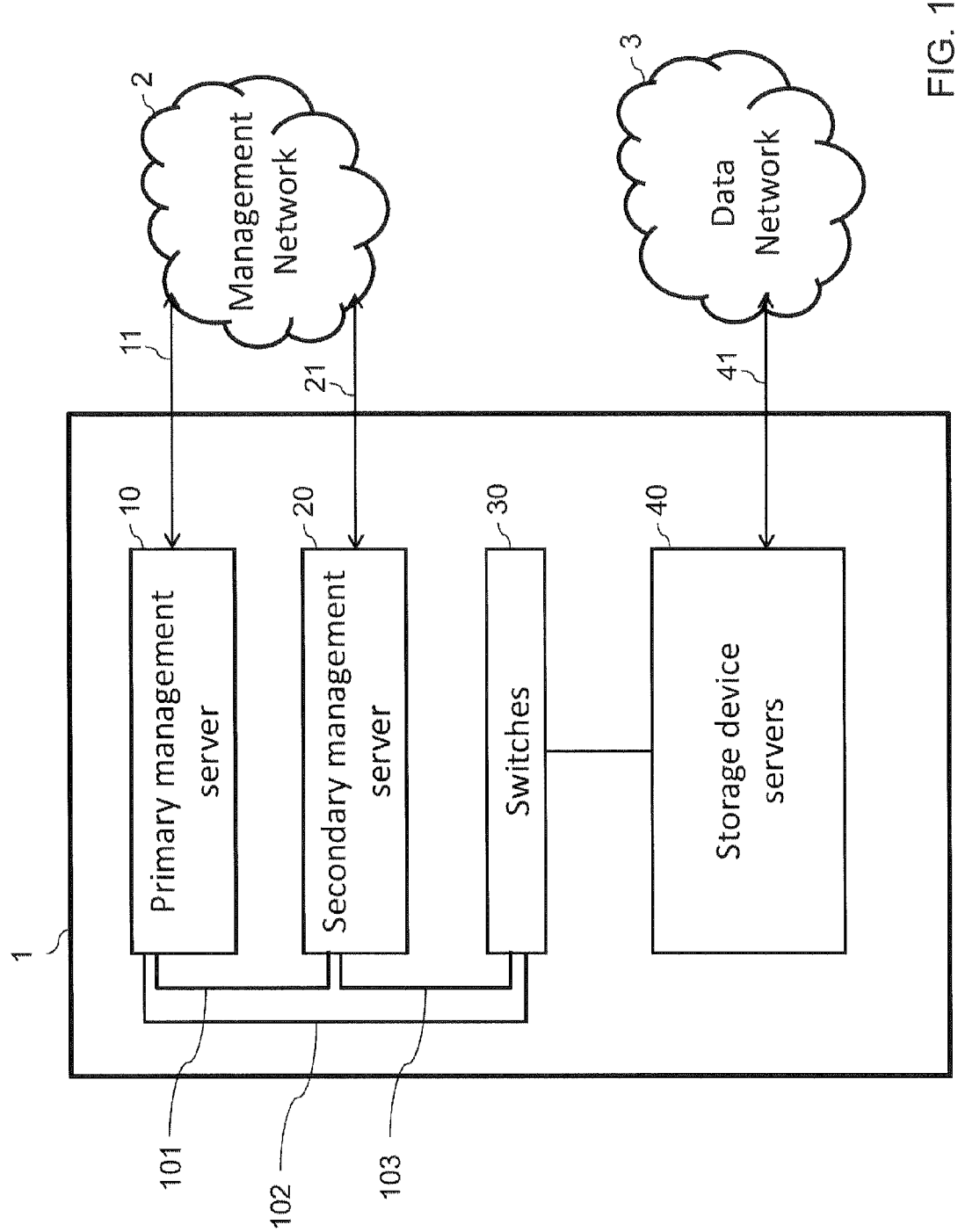
FIG. 1 illustrates generally a storage system according to some embodiments of the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave or act according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component can be embodied in operational data or operation data can be used by a presently disclosed component. By way of example, such operational data can be stored on intangible computer readable medium. The operational data can be a single data set, or it can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

As used herein, the phrase "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions various functional terms refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such tangible information storage, transmission or display devices.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

Various examples of the presently disclosed subject matter relate to or imply a storage unit. In examples of the presently disclosed subject matter the term "storage unit" is used to refer to flash storage unit as well as solid-state storage unit. It would be appreciated by those versed in the art that certain embodiments of the present invention are applicable to any solid-state storage unit that is operable according to the presently disclosed subject matter, and are not necessarily limited to any one particular type of solid-state storage unit. Other non-limiting examples of a solid-state storage unit can include non-volatile storage units, such as NAND based flash memory, and volatile storage units, such as RAM or DRAM storage units.

Furthermore, many of the components described herein above can be referred to as network interfaces or Netif/NIC. Basically, it is understood in the following that a network interface can be either physical or logical and that a network interface is at least capable of: (1) being allocated an IP address (i.e. an IP address may be attached to/maintained on the network interface) and (2) answering a "who has" IP request by answering "I have" back to the origin of the request or by alternatively flooding back the network with the IP request.

FIG. 1 discloses a storage system 1 according to embodiments of the present disclosure which may comprise a primary management server 10 and a secondary management server 20, switches 30, one or more storage device servers 40 of one or more corresponding storage units such as flash storage units (not shown). The primary management server 10 may be provided with a primary management telecommunication connection 11 (also referred to as primary connection hereinafter) with a management network 2 which can be for example a Local Access Network of a user of the storage system 1. The secondary management server 20 may be provided with a secondary management telecommunication connection 21 (also referred to as secondary connection hereinafter) to the management network 2. The storage device servers 40 may be provided with a data telecommunication link 41 to a data network 3. For example, the data network 3 and data telecommunication link 41 may use Fiber Channel 8 Gigabit (or more) technology or IP (Ethernet) 10 Gigabit (or more) technology. Optionally, the storage device servers may be provided with a secondary data telecommunication link (not shown) to the storage network 3.

The primary management server 10 may be provided with an inter-server telecommunication link 101 with the secondary management server 20. Optionally, the inter-server telecommunication link 101 between the primary management server 10 and the secondary management server 20 may be provided by using a first link 102 from the primary server 10 to the switches 30 and a second link 103 from the secondary management servers 20 to the switches 30. The inter-server telecommunication link 101 may enable to pass data from the primary management server 10 to the secondary management server 20 and vice versa. The switches 30 may enable to direct data to a given storage system server among the plurality of storage system servers 40. Optionally, as described hereinabove, the switches 30 may also enable to communicate data between the primary and secondary management servers 10, 20. As will be described in more details with reference to FIG. 3, the primary and secondary management servers 10, 20 may configured to provide a high availability.

The secondary management server 20 may act as a backup server in case the primary management server 10 fails. The secondary management server 20 may therefore be configured to be capable of handling the same operations as the primary management server 10. The primary management server 10 may be configured to control the interaction between hosts (not shown) and the storage units (not shown) of the storage system 1. As described above, the switches 30 or any other interconnection components can be used to allow connection of many hosts to many storage units, and the primary management server 10 can be implemented as intermediate control and management layer. The primary management server 10 can also be adapted to control and manage various aspects of the operation of the components of the storage system 1. Thus for example, the storage units within the storage system 1 can allocate storage resources for storing user data therewithin, and the primary management server 10 can register the storage resources externalized by each one of the storage units. The primary management server 10 can implement a file system and/or use allocation tables to control the writing of data to the underlying storage devices and the exchange of I/O traffic in-between the hosts and the storage units, and in between the storage unit themselves. In accordance with an example of the presently disclosed subject matter, the primary management server 10 can implement a block device file system over the plurality of storage units that are associated with the primary management server 10. Accordingly, and still by way of example, the primary management server 10 can provision logical blocks to the hosts. The mapping of the logical blocks to physical storage resources within the storage devices with which the primary management server 10 is associated is discussed below.

It would be appreciated that while the primary management server 10 is described here as a dedicated central component that is operatively connected to each of the storage units in the storage system 1 and to the hosts, the primary management server 10 can be a distributed component and can be implemented as part of the storage units themselves, in a manner known per-se.

It would be appreciated by those of ordinary skill in the art, that various implementations of a storage system control layer are known in the art and can be readily used with examples of the presently disclosed subject matter, possibly in conjunction with further or less components and/or operations, as necessary in accordance with examples of the presently disclosed subject matter.

According to an example of the presently disclosed subject matter, the storage system servers 40 can each include an interface, a storage unit controller, a storage configuration module, a storage space configurator and one or more arrays of memory cells which are collectively referred to herein as the physical storage space of the storage unit. By way of example, the interface can be operable for connecting the storage unit with the primary management server 10. Further by way of example, the interface can be operable for connecting the storage unit with the other storage units of the storage system 1 and/or with the hosts themselves directly, for instance in case the primary management server 10 is integrated into the storage devices.

By way of example, data can be written into or read from the storage unit through the processing of the storage unit controller. The storage unit controller can also be used for erasing memory cells and for performing various device management operations according to instructions from a device management program. By way of example, processing instructions and processing data can be memorized by the memory for use by the storage unit controller. It would be appreciated that memory can be implemented using any commercially available or yet to be devised computer memory technology, including, but not limited to RAM, DRAM, SRAM.

The storage configuration module includes configuration definitions of the storage unit, including for example configuration definitions of the physical storage space of the storage unit and of the memory cells. The storage configuration module can be used to initiate and configure memory management operations within the storage unit. By way of example, the storage configuration module can execute wear leveling procedures, manage bad blocks, etc. The storage configuration module can be electronically connected to the storage controller and the two components can operate cooperatively to execute the procedures and routines and to use the configurations provided by the storage configuration module.

Figure 2:
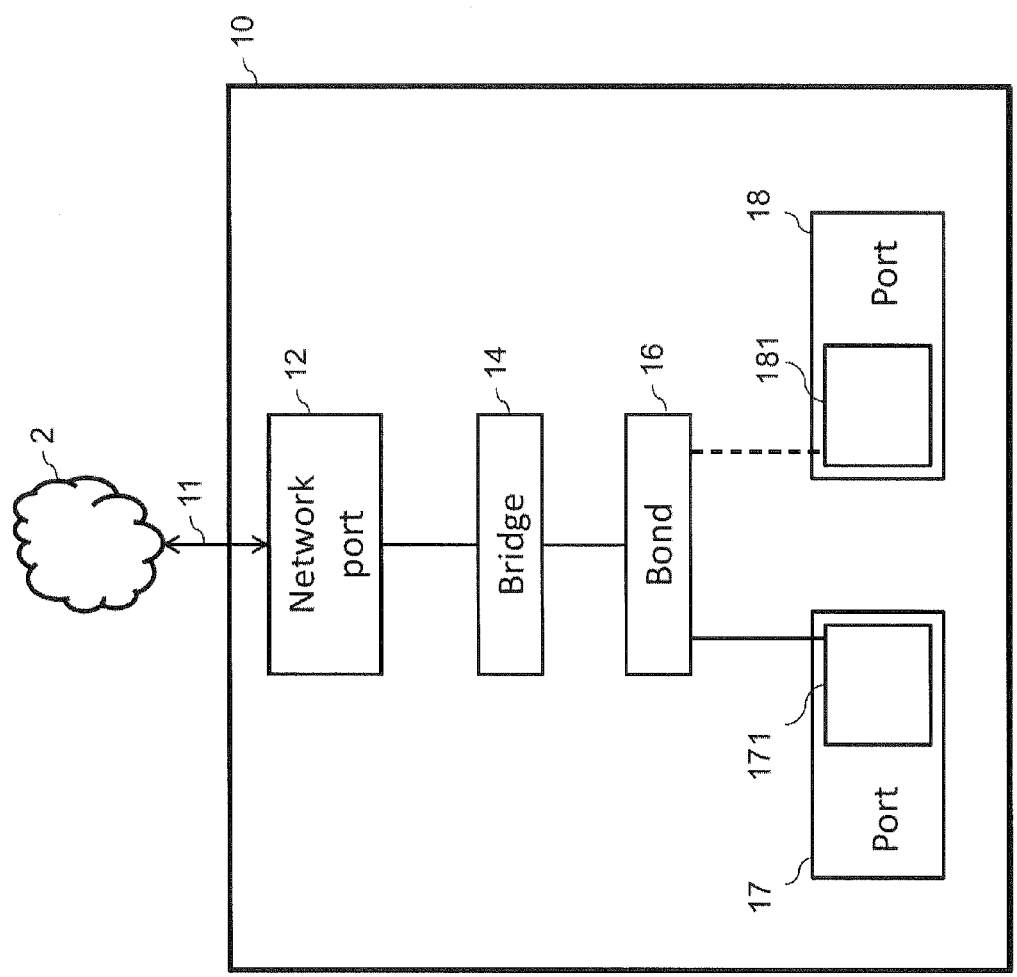
FIG. 2 illustrates a management server of a storage system according to some embodiments of the resent disclosure.

FIG. 2 illustrates in more details the previously depicted primary management server 10. The primary management server 10 may comprise a network port 12, a bridge 14 a bond 16, a management port 17 and an additional management port 18. The management port 17 and the additional virtual port 18 comprise respectively a virtual port 171 and an additional virtual port 181.

The network port 12 may be a physical entity configured to interface the primary management server 10 and the management telecommunication network 2 for enabling communication of management data between the primary management server 10 and the telecommunication network 2. For example, the management data may be an email from the primary management server 10 providing indication to a user on an available dedicated storage space of the storage system 1. The management data may in another example be a request from a user to create or delete a volume in the storage system 1. The network port may be an Ethernet port and particularly a 1 Gigabit Ethernet port.

The bridge 14 (also referred to as virtual bridge in the present application) may be a virtual (logical) entity. For example, the bridge may be a piece of software run by the operating system on the primary server 10. The bridge 14 may comprise a first gate and a second gate. The bridge 14 may be configured to channel data packets transferred to and from the network port 12 i.e. data to and from the network port 12 are passed through the bridge 14 by the first and second gates. The first gate may be configured to transfer management data to and from the network port i.e. the network port 12 and the first gate of the bridge 14 may be logically linked so that data from the network port pass through the first gate of the bridge 14 and data from the first gate of the bridge 14 pass though the network port 12. Further operation may be performed on the data while transferring through the bridge 14. For example, the bridge 14 may be configured to selectively enable or disable data transfer between the first and the second gates. Further, the bridge 14 may be configured to filter packets by only allowing Address Resolution Protocol (ARP) packets and IP packets. Also, the bridge 14 may be by default disabled (also referred to as in disabled state i.e. blocking data transfer between the first and second gates).

The bond 16 may be a virtual (logical) entity i.e. a piece of software. The second gate of the virtual bridge 14 may be logically linked to the bond 16 so that data from the second gate of the bridge 14 pass through the bond 16 and data from the bond 16 pass through the second gate of the virtual bridge 14. The bond 16 may be configured to aggregate links from the virtual management port 171 and the additional management port 181 in an active/passive configuration mode. The active/passive configuration mode may be defined as a configuration mode in which only one of the links from the virtual management port and the additional virtual management port is operational at the same time. On the figures, the operational link is represented with a plain line whereas the non-operational link is represented with a dashed line.

The management port 17 and the additional virtual port 18 may be configured to interface the primary management server 10 to the storage units. The management port 17 and additional management port 18 may be Ethernet ports. Providing an additional management port 18 may enable to increase availability by providing a redundancy in case of failure of the management port 17. The management servers may communicate with the storage units and/or with the storage servers. The virtual management port 171 and the additional virtual management port 181 may be respectively provided on the management port 17 and additional management port 18 as logical entities. As described hereinafter with reference to FIG. 3, the virtual management port 171 and additional virtual management port 181 may be used for transferring management data to and from the storage system 1. Using virtual ports may enable to improve security by differentiating ports for different types of data. As explained above, logical links may be provided between the virtual management port 17 and the bond 16 and between the additional virtual management port 18 and the bond 16.

It is noted that the layer 2 connectivity illustrated is given as an example and that a similar mechanism may be used in a layer 3 topology, with IP routing instead of bridging/bonding. This would mean replacing the "virtual bridge" and "bond" with a "virtual router" and IP tunneling and may require maintaining separately the routing rules, in a similar manner to the way the bridging rules described herein.

Figure 3:
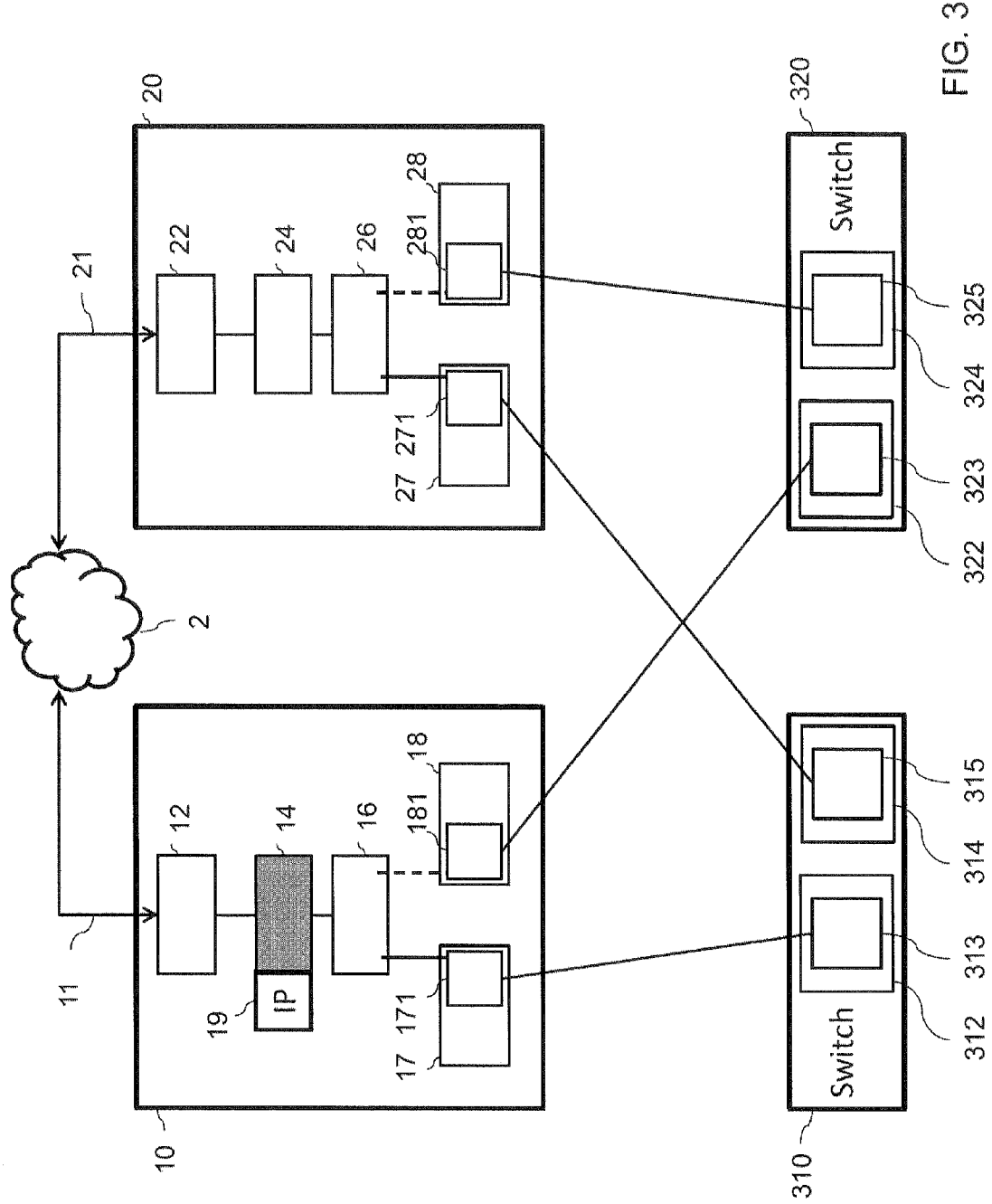
FIG. 3 illustrates a management module of a storage system according to some embodiments of the present disclosure.

FIG. 3 illustrates a management module according to embodiments of the present disclosure. The management module may comprise a primary server 10 (as previously described) and a secondary server 20. The primary and secondary servers 10, may be connected to enable data communication between them. In the embodiment illustrated, the communication between the primary and secondary servers 10, 20 is made using first and second switches 310, 320. Further, the primary and secondary servers 10, 20 may be connected to the management network 2 via a primary connection 11 and a secondary connection 21.

For the sake of conciseness, the secondary management server 20 is not repeated herein below because—as a backup server—the secondary management server 20 comprises the same elements as the primary management server 10. Therefore, the secondary management server 20 comprises a network port 22, a bridge 24 a bond 26, a management port 27 and an additional management port 28. The management port 27 and the additional virtual port 28 comprise respectively a virtual port 271 and an additional virtual port 281.

The first and second switches 310, 320 may comprise respectively first ports 312, 322 and second ports 314, 324 on which first virtual ports 313, 323 and second virtual ports 315, 325 may be configured. The first and second virtual ports 313, 315 of the first switch 310 may be linked and the first and second virtual ports 323, 325 of the second witch 320 may be linked so that data entering the any of the first or second virtual ports exits the switch from the other virtual port. The virtual management port 171 of the primary server 10 may be linked to the first virtual port 313 of the first switch 310 and the virtual management port 271 of the secondary server 20 may be linked to the second virtual port 315 of the first switch 310. The additional virtual port 171 of the primary server 10 may be linked to the first virtual port 323 of the second switch 320 and the additional virtual management port 281 of the secondary server 20 may be linked to the second virtual port 325 of the second switch 320.

It would be noted that in general, the data communication between the bridge 14 of the primary server 10 and the bridge 24 of the secondary server 24 may be provided through different configurations. Further, an IP address 19 of the management module may be attached to the bridge 14 of the primary server 10. The bridge 14 of the primary server 10 may be disabled so as to prevent data transfer between the first and second gates of the virtual bridge 14. The bridge 24 of the secondary server 20 may be enabled to allow data transfer between the first and second gates of the virtual bridge 24.

It is noted that, since the primary and secondary servers 10, 20 include the same elements, they are interchangeable. In fact, the server including the bridge on which the IP address is attached is defined as the primary server and the bridge of the primary server is in disabled state while the bridge of the other server is in enabled state.

The management module according to the present disclosure enables a redundant routing to and from the IP address 19 attached on the bridge 14. A first routing is given via the primary connection 11 from the management network 2 to the network port 12 of the primary server 10 and from the network port 12 to the bridge 14. A second routing is provided via the secondary connection 21 from the management network 2 to the network port 22 of the secondary server 20, from the network port 22 of the secondary server 20 to the bridge 24 of the secondary server 20, from the bridge 24 of the secondary server 20 to the bond 26 of the secondary server 20, from the bond 26 of the secondary server 20 to the virtual management port 271 of the secondary server 20, from the virtual management port 271 of the secondary server 20 to the second virtual port 315 of the first switch 310, from the second virtual port 315 of the first switch 310 to the first virtual port 313 of the first switch 310, from the first virtual port 313 of the first switch 310 to the virtual management port 171 of the primary server 10, from the virtual management port 171 of the primary server 10 to the bond 16 of the primary server 10 and from the bond 16 of the primary server 10 to the bridge 14 of the primary server 10 to which the IP is attached.

In other words, the primary and secondary servers 10, 20 are connected to each other so that: the virtual management port 171 of the primary server 10 is connected, directly or via the first switch 310, to the virtual management port 181 of the secondary server 20; the additional virtual management port 181 of the primary server 10 is connected, directly or via the second switch 320, to the additional virtual management port 281 of the secondary server 20; outgoing traffic from the virtual management port 171 of the primary server 10 can only reach the virtual management port 271 of the secondary server 20 and outgoing traffic from the additional virtual management port 181 on the primary server 10 can only reach the additional virtual management port 281 on the secondary server 20. Further, the bridge forwarding is disabled on the primary server (where the IP is set) in order to prevent a loop within the management network 2.

The present disclosure implements several efficient features: setting a single IP address on the primary server 10, connecting the secondary and primary servers 10, 20 to the management network 2 with a cable (preferably a single cable) connecting each server 10, 20 to the management network 2; making network routing to the IP address available via both primary and secondary servers 10, 20; preventing the primary and secondary servers 10, 20 from creating a loop. Particularly, prevention of a loop is obtained by disabling the bridge on which the IP is attached while enabling the other bridge. Thus, high availability of the IP is achieved since in the event the primary's server connection 11 to the management network fails, routing can be done via the secondary server 20. Advantageously, use of the present disclosure does not require extra hardware and the user only has to allocate a single IP address. Further, there is no risk of having external networking failure causing a transition between the primary and secondary roles. Indeed, in standard clustering techniques, external connectivity redundancy is generally obtained by assigning the IP address to the primary server, and if the active entity fails to communicate (e.g. because of external networking failure)—a fail-over of the primary server role takes place to allow communication. In the present disclosure such role change does not take place in such external network failure situation.

Further, a Network Address Translator (NAT) may be used in order to avoid the network address of the bridge 14 of the primary server 10 to appear on two different ports in the management network 2. The NAT may be used to attach a specific network address to management data generated on the primary server and routed to the telecommunication network via the secondary server. The NAT may further be used so that when receiving management data from the secondary server designated to the specific network address, the translator translates the network address to that of the primary server. In general the purpose of the NAT mechanism is to ensure that management data arriving from the primary server through the secondary port would seem on the external network identical to management data arriving through the primary port. To this end, the source MAC address is rewritten on outgoing traffic (from the primary server to the external network via the secondary), and rewritten back on the return path (from the external network through the secondary to the primary server), so the primary server could accept the data as its own.

Additionally, in the event the primary server 10 fails entirely, the secondary server 20 can take over IP as described hereinafter with reference to FIG. 4.

Figure 4:
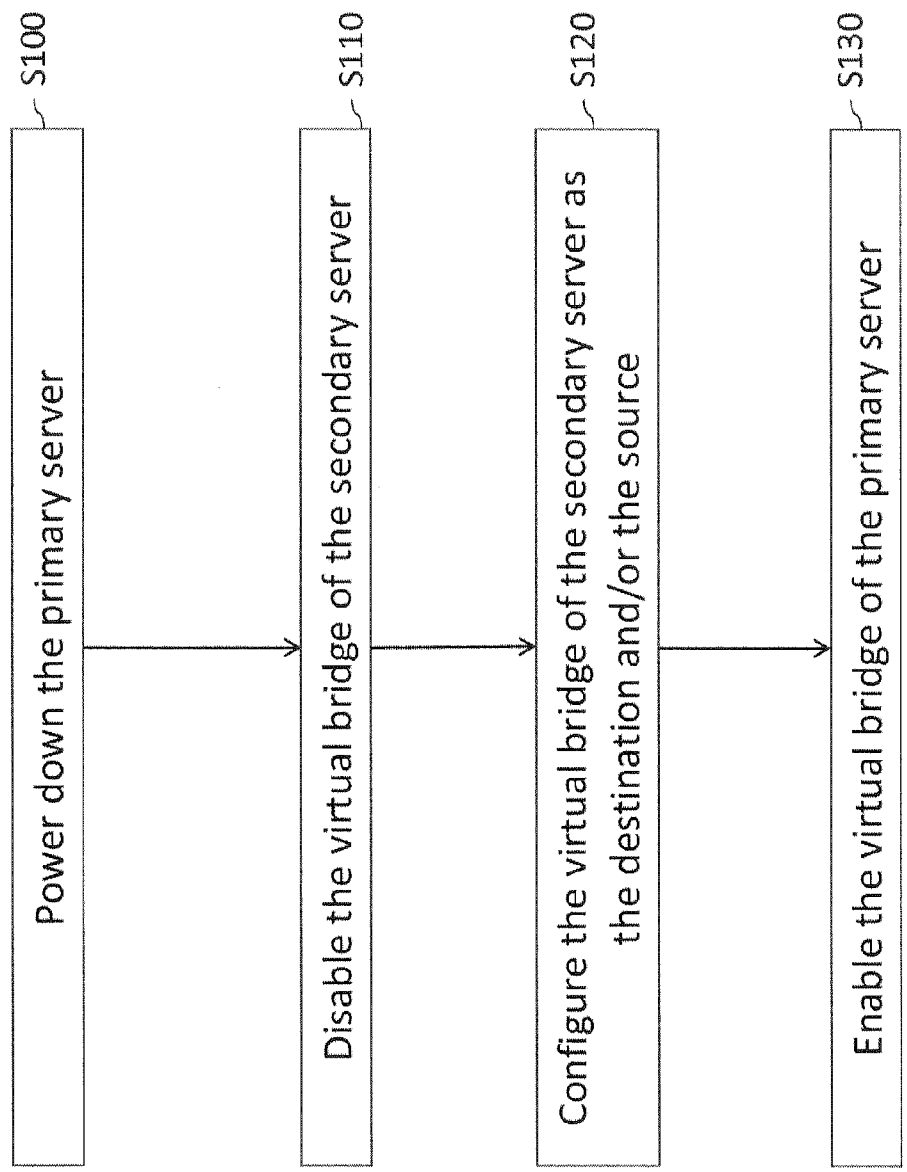
FIG. 4 illustrates a method of handling primary server failure according to some embodiments of the present disclosure.

FIG. 4 illustrates a method of handling primary server failure according to embodiments of the present disclosure. Indeed, the previously described management module may enable to efficiently handle primary server. In a first step S100, the primary server may be powered off. In a second step S110 the virtual bridge of the secondary server may be disabled so as to prevent data traffic through the virtual bridge of the secondary server. In a third step S120, the virtual bridge may be configured as the destination and/or source of the data communicated to and/or from the management module i.e. the IP address of the management module may be set on the virtual bridge of the secondary server. In a fourth step S130, if the primary server returns to an operational state, the virtual bridge on the primary server may be enabled so as to allow data transfer through the bridge of the primary server. This leads to inverting the roles of the primary and secondary servers.

FIG. 5 illustrates the management module previously described with reference to FIG. 3 after the described method described with reference to FIG. 4 is carried out. For the sake of conciseness, the description of the elements which are not changed is not repeated. As explained above, in case of primary server failure, the virtual bridge 24 of the secondary server is disabled and the IP address 19 of the management module is set on the virtual bridge 24 of the secondary server. In the event the primary server 10 recovers, the virtual bridge 14 of the primary server may be configured to enable data transfer there through.

While various embodiments have been shown and described, it will be understood that there is no intent to limit the invention by such disclosure, but rather, it is intended to cover all modifications and alternate constructions falling within the scope of the invention, as defined in the appended claims.

The invention claimed is:

1. A management module for a storage device, the management module comprising:
a primary server and a secondary server, each server comprising:
a network port configured to interface the server and a telecommunication network; and
a virtual bridge configured to selectively enable or disable data transfer to and from the network port;
wherein:
the virtual bridges of the primary and secondary servers are linked for enabling data transfer between said virtual bridges;
the virtual bridge of the primary server is configured to disable data transfer while the virtual bridge of the secondary server is configured to enable data transfer; and
the virtual bridge of the primary server is further configured to maintain an IP address of the management module.

2. The management module according to claim 1, the primary and secondary servers each further comprising:
a management port configured to interface the server and the storage device, and
a virtual port provided on the management port, the virtual bridge being linked to the virtual port to enable management data transfer to and from the virtual port;
wherein the virtual ports of the primary and secondary servers are linked to enable data transfer between said virtual ports.

3. The management module according to claim 1, further comprising a switch configured for selectively enabling data transfer between the virtual bridges of the primary and secondary servers.

4. The management module according to claim 1, wherein data transfer between the virtual bridges of the primary and secondary servers is provided using redundant links.

5. The management module according to claim 2, the primary and secondary servers each further comprising:
an additional management port configured to provide a supplementary interface between the server and the storage device;
an additional virtual port provided on the additional management port; and
a bond configured to aggregate a link from the virtual port and an additional link from the additional virtual port and to enable data transfer to and from the virtual bridge.

6. The management module according to claim 5, wherein for each of the primary and secondary server, the additional virtual port and the virtual port are alternatively configured to be passive thereby providing an active/passive bonding configuration.

7. The management module according to claim 1, wherein the telecommunication network is a Local Area Network.

8. The management module according to claim 1, further configured to communicate using TCP/IP protocols.

9. The management module according to claim 1, wherein the network port is an Ethernet port.

10. The management module according to claim 1, wherein each of the primary and secondary servers further comprise an application unit capable of managing at least one volume entity on the storage device upon reception of management data.

11. The management module according to claim 10, wherein the application unit enables to create or to delete a volume entity from the storage device.

12. The management module of claim according to claim 10, wherein the application unit of each of the primary and secondary servers is further capable of sending email alerts when a predefined rate of the volume entity is used.

13. The management module according to claim 1, further comprising a control management interface configured for enabling management of the management module by a remote user, the management interface being either a command line interface or a graphical user interface.

14. The management module according to claim 1, further comprising a network address translator configured for avoiding the virtual bridge of the primary server to appear on two different ports in the telecommunication network.

15. The management module according to claim 14, wherein the network address translator is configured to attach a specific network address to management data generated on the primary server and routed to the telecommunication network via the secondary server.

16. The management module according to claim 15, wherein, when receiving management data from the secondary server designated to said specific network address, the translator translates the network address to that of the primary server.

17. The management module according to claim 1, wherein in case the primary server fails the management module is further configured to:
(a) power down the primary server;
(b) disable the virtual bridge of the secondary server; and
(c) configure the virtual bridge of the secondary server as the destination and/or the source of the management data communicated to and/or from the management module.

18. The management module according to claim 17, wherein, in the case the primary server recovers, the management module is further configured to enable the virtual bridge of the primary server.

19. The management module according to claim 1, wherein the primary and secondary servers are implemented on a single computer machine.

20. A method of configuring a primary management server and a secondary management server of a management module, wherein both the primary and secondary servers are configured to be connected to a telecommunication network by a network port, the method comprising:
providing each server with a virtual bridge configured to selectively enable or disable data transfer to and from the network port;
disabling the virtual bridge of the primary server while enabling the virtual bridge of the secondary server;
linking the virtual bridges of the primary and secondary servers so as to enable data transfer between said second gates; and
configuring the virtual bridge of the primary server to maintain the IP address of the management module.

* * * * *